United States Patent
Kunida et al.

(10) Patent No.: US 9,690,288 B2
(45) Date of Patent: Jun. 27, 2017

(54) ELECTRONIC APPARATUS INCLUDING A MOTOR DRIVING DEVICE

(71) Applicant: Rohm Co., Ltd., Kyoto (JP)

(72) Inventors: Yuji Kunida, Kyoto (JP); Takashi Yoshiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 111 days.

(21) Appl. No.: 14/721,506

(22) Filed: May 26, 2015

(65) Prior Publication Data

US 2015/0346715 A1 Dec. 3, 2015

(30) Foreign Application Priority Data

May 30, 2014 (JP) ................. 2014-112088

(51) Int. Cl.
| | |
|---|---|
| H02P 6/18 | (2016.01) |
| G05B 23/00 | (2006.01) |
| H02P 1/02 | (2006.01) |
| H02H 7/085 | (2006.01) |
| H02P 29/024 | (2016.01) |

(52) U.S. Cl.
CPC .......... *G05B 23/00* (2013.01); *H02H 7/0851* (2013.01); *H02P 1/022* (2013.01); *H02P 1/029* (2013.01); *H02P 29/0241* (2016.02)

(58) Field of Classification Search
CPC ........................................................ H02P 6/18
USPC .............. 318/400.09, 400.1, 400.11, 400.13, 318/400.21, 400.32, 400.34, 400.35
See application file for complete search history.

(56) References Cited

U.S. PATENT DOCUMENTS

| | | | | |
|---|---|---|---|---|
| 3,823,343 | A * | 7/1974 | Steen ........................ | H02H 7/12 361/84 |
| 4,808,902 | A * | 2/1989 | Miyazaki ................ | H02P 25/03 318/723 |
| 4,922,169 | A * | 5/1990 | Freeman ................... | H02P 6/22 318/400.1 |
| 5,298,838 | A * | 3/1994 | Peters ....................... | H02P 6/22 318/400.1 |
| 6,249,101 | B1 * | 6/2001 | Viti .......................... | H02P 6/22 318/560 |

FOREIGN PATENT DOCUMENTS

JP      2012-070605      4/2012

* cited by examiner

*Primary Examiner* — Bentsu Ro
(74) *Attorney, Agent, or Firm* — Fish & Richardson P.C.

(57) ABSTRACT

The present invention provides a motor driving device for easily and accurately detecting an abnormal status of a motor. The motor driving device (21) includes a control circuit (100) for generating a driver control signal (S10); a driving circuit (200) for generating a motor driving signal (S3) according to the driver control signal (S10); an initial position detecting circuit (300) for detecting an initial position of a motor (22); and a rotation detecting circuit (400) for detecting a rotation status of the motor (22). Before the motor (22) starts to rotate normally, the control circuit (100) repeatedly performs a serial activation processing including detecting an initial position; applying an initial torque and detecting a motor rotation, and when the repetition number reaches a threshold value "m" (for example, m=5), the motor (22) is forced stop.

7 Claims, 6 Drawing Sheets

ELECTRONIC APPARATUS INCLUDING A MOTOR DRIVING DEVICE

BACKGROUND

In the course of activating or driving of a motor, when a motor is constrained (or in similar abnormal states) due to a certain factor (the motor suppressed by a hand, for example), a motor driving device or the motor may be damaged by the current continuously flowing into specific phases (e.g. from phase U to phase V).

A constraint protection circuit is embedded in a conventional motor driving device. When there is no indication of a FG (frequency generator) signal (a motor rotation speed signal) generated within a predetermined time period, the constraint protection circuit will identify the motor being in the constraint state and force stop the driving of the motor.

In addition, the patent literature 1 is an example relating to the present disclosure.

PRIOR TECHNICAL LITERATURE

Patent Literature

[Patent literature 1] Japanese patent laid-open publication No. 2012-70605.

BRIEF SUMMARY OF THE INVENTION

Problems to be Solved in the Present Invention

When the motor is a sensor-based motor, the constraint protection action may be implemented by monitoring the FG signal generated by a Hall element.

On the other hand, when the motor is a sensorless motor, the constraint protection action may be implemented by monitoring the FG signal obtained by detecting voltage induced by coils of the motor. However, in the constraint state, the FG signal may be also asserted due to noise or some other non-ideal conditions, thus making it difficult to accurately protect the motor by monitoring the FG signal.

In view of the problems found by the inventors of the present application, it is the object of the present invention to provide a motor driving device for easily and accurately detecting an abnormal state of a motor.

Technical Means for Solving Problems

In order to achieve the object, the motor driving device of the present invention is configured to include a control circuit for generating a driver control signal; a driving circuit for generating a motor driving signal according to the driver control signal; an initial position detecting circuit for detecting an initial position of a motor; and a rotation detecting circuit for detecting a rotation status of the motor, wherein before the motor starts to rotate normally, the control circuit repeatedly performs a serial activation processing including detecting an initial position, applying an initial torque and detecting a motor rotation, and forces to stop driving the motor when a repetition number reaches a threshold value (the first configuration).

Further, in the motor driving device including the first configuration, it is configured that the initial position detecting circuit detects the initial position by inductive sensing (the second configuration).

Further, in the motor driving device including the first or second configuration, it is configured that the rotation detecting circuit monitors voltage induced in a motor coil, for detecting the rotation status of the motor (the third configuration).

Further, in the motor driving device including the third configuration, it is configured that the rotation detecting circuit generates a zero crossing signal for each phase according to the voltage induced in the motor coil, and generates a motor rotation speed signal corresponding to a motor rotation speed according to the zero crossing signal of each phase, and the control circuit monitors the zero crossing signal of each phase or the motor rotation speed signal for detecting whether the rotation status of the motor is normal (the fourth configuration).

Further, the motor driving device including any one of the first to fourth configurations, it is configured that when the rotation status of the motor becomes abnormal, the control circuit performs the activation processing again.

Further, in the motor driving device including any one of the first to fifth configurations, it is configured that during the activation processing, the control circuit repeatedly performs multiple sets of the detecting an initial position and the applying an initial torque, then performs the motor rotation detection (the sixth configuration).

Further, the semiconductor device of the present invention is configured to be formed by integrating the motor driving device of any one of the first to sixth configurations (the seventh configuration).

Further, the electronic apparatus of the present invention is configured to include the semiconductor device of the seventh configuration; and a sensorless motor driven by the semiconductor (the eighth configuration).

In addition, the electronic apparatus including the eighth configuration further includes a digital signal processor for generating a target rotation speed signal; and a PLL (phase locked loop) circuit for generating an acceleration signal and a deceleration signal to the semiconductor device by performing a phase synchronization control of the target rotation speed signal input from the digital signal processor and a motor rotation speed signal input from the semiconductor device (the ninth configuration).

Additionally, the electronic apparatus including the ninth configuration further includes a first substrate for carrying the digital signal processor and the PLL circuit; and a second substrate for carrying the semiconductor device and the sensorless motor (the tenth configuration).

Effects of the Present Invention

If the motor driving device of the present invention is used, an abnormal status of a motor can be easily and accurately detected.

DETAILED DESCRIPTION

<Electronic Apparatus>

Figure 1:
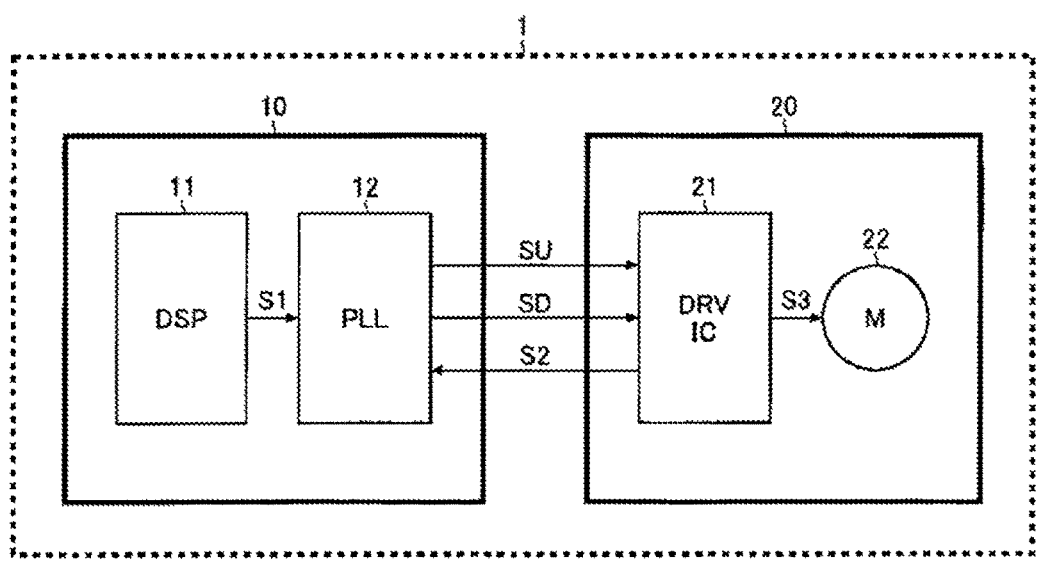
FIG. 1 is a schematic view showing the whole configuration of the electronic apparatus.

FIG. 1 is a schematic view showing a configuration of an electronic apparatus. In this embodiment, the electronic apparatus 1 includes a main circuit board 10 and a motor circuit board 20. A digital signal processor (hereafter, DSP) 11 and a PLL circuit 12 are disposed on the main circuit board 10. On the other hand, a motor driver IC 21 and a sensorless motor 22 are disposed on the motor circuit board 20.

The DSP 11 produces a target rotation speed signal 51 (frequency signal) corresponding to a target rotation speed of the sensorless motor 22, and outputs the target rotation speed signal 51 to the PLL circuit 12.

The PLL circuit 12 produces and outputs an acceleration signal SU and a deceleration signal SD to the motor driver IC 12 by performing a phase synchronization control on the target rotation speed 51 input from the DSP 11 and a motor rotation speed signal S2 (referred as a frequency signal of a frequency generator (FG) signal) input from the motor driver IC 21. Specifically, the PLL circuit 12 generates a pulse of the acceleration signal SU while the frequency of the motor rotation speed signal S2 is less than the frequency of the target rotation speed signal 51 (the motor rotation speed is lower than the target rotation speed), and generates a pulse of the deceleration signal SD while the frequency of the motor rotation speed signal S2 is higher than the target rotation speed 51 (the motor rotation speed is higher than the target rotation speed).

The motor driver IC 21 is a semiconductor device integrating a motor driving device of a driving control main body of the sensorless motor 22. The motor driver IC 21 produces a motor driving signal S3 according to the acceleration signal SU and the deceleration signal SD input from the PLL circuit 12, and performs a driving control of the sensorless motor 22 by using the motor driving signal S3. Further, the motor driver IC 21 produces the motor rotation speed signal S2 corresponding to the motor rotation speed of the sensorless motor 22 by detecting voltage induced in the motor coil, and outputs the motor rotation speed signal S2 to the PLL circuit 12.

The sensorless motor 22 is driven by the motor driving signal S3 input from the motor driver IC 21. Due to the fact that no Hall element presents in the sensorless motor 22, it is advantageous for hardware miniaturization or cost reduction.

<Motor Driver IC>

Figure 2:
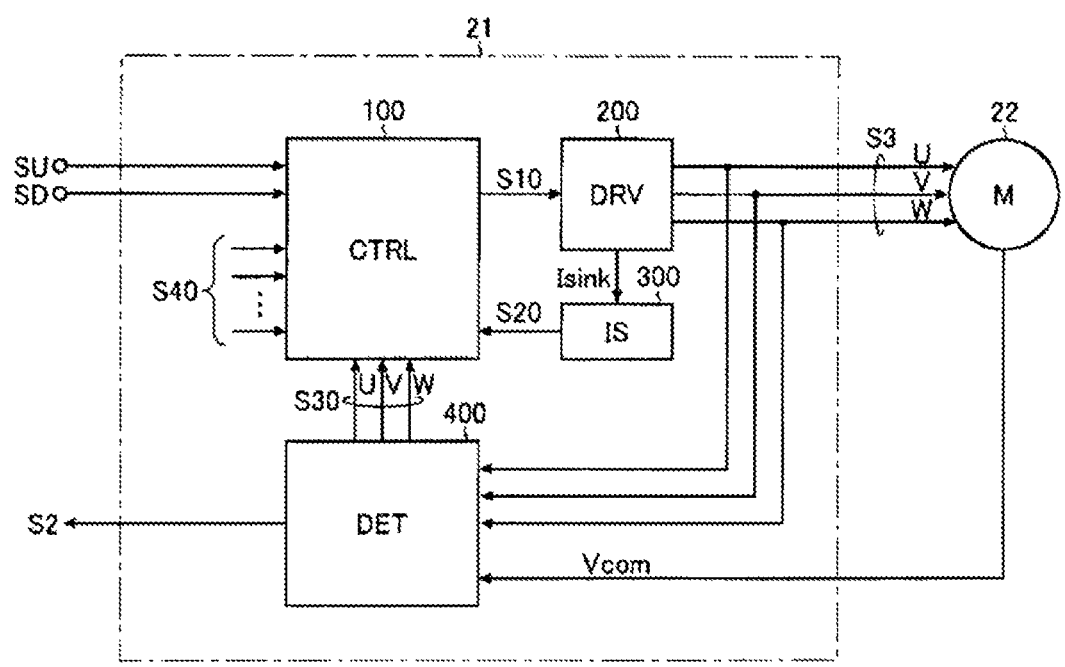
FIG. 2 is a schematic view showing the motor driver IC 21 in accordance with an embodiment.

FIG. 2 is a schematic view showing the motor driver IC 21. In the motor driver IC 21 of the embodiment, a control circuit 100, a driving circuit 200, an initial position detecting circuit 300, a rotation detecting circuit 400 and a phase-locked identifying circuit 500 are integrated in a circuit block for forming a motor driving device.

The control circuit 100 receives the input of the acceleration signal SU and the deceleration signal SD for generating a diver control signal S10. Specifically, the control signal 100 generates the driver control signal S10 by the following methods: receiving the pulse of the acceleration signal SU and increasing the motor rotation speed when receiving the pulse of the acceleration signal SU; and reducing the motor rotation speed when receiving the deceleration signal SD. Additionally, the control circuit 100 receives the input of an initial position detecting signal S20 or a zero crossing signal S30 (or motor rotation speed signal S2), so as to perform an activation operation or a rectification operation of the sensorless motor 22. Further, in addition to receiving the signals, the control circuit 100 receives various control signals S40 (a temperature protection signal or a voltage reduction protection signal), and generates the driver control signal S10 in response to the content of these signals.

Further, the control circuit 100 includes the following function: when the activation processing of the sensorless motor 22 cannot be ended normally, performing the motor constraint protection action. Details regarding the function are described as follows.

The driving circuit 200 generates motor driving signals S30 with three phases (U, V, W) according to the driver control signal S10 input from the control circuit 100, and outputs the motor driving signals S30 to a motor coil of each phase of the sensorless motor 22.

When the sensorless motor 22 is activated, the initial position detecting circuit 300 detects the initial position of the sensorless motor 22 (an initial phase of a rotor), and generates the initial position detecting signal S20 which indicates the detection result. In addition, the method for detecting the initial position of the sensorless motor 22 may use inductive sensing, for example. When each phase path (U→V, U→W, V→U, V→W, W→U, W→V, 6 modes) of the stopped sensorless motor 22 is respectively supplied with test current, the initial position detecting circuit 300 sorts the current flowing into each phase path, and detects the initial position of the sensorless motor 22 bases on the sorting result. Further, the sink current Isink flowing into the driving circuit 200 can be detected as the current flowing into each phase path. In addition, like the normal driving of the sensorless motor 22, the supply of the test current is performed by using the control circuit 100 and the driving circuit 200. Further, in order to prevent the sensorless motor 22 from being rotating due to the test current, it is desired that the current value of the test current is less than the current value during the normal driving. Moreover, it is preferred that the supply period of the test current is shorter than the supply period of the normal driving.

The rotation detecting circuit 400 respectively detects the zero crossing timing (the consistent timing of the induced voltage of each phase and the neutral voltage Vcom) of the voltage induced in the motor coil of each phase, and generates the zero crossing signal S30 of each phase (U, V, W). Further, during the detection of the zero crossing timing, each phase output of the driving circuit 200 is set as a high impedance status to facilitate the observation of the voltage induced in the motor coil.

Further, the rotation detecting circuit 400 generates a motor rotation speed signal S2 according to the zero crossing signal S30 of each phase (U, V, W), and outputs the motor rotation speed signal S2 to the PLL circuit 12. In addition, the zero crossing signal S30 of any phase (for example, the phase U) can be selected to be output as the motor rotation speed signal S2, or the zero crossing signal S30 of any phase (U, V, W) can be synthesized to produce the motor rotation speed signal S2.

<Activation Processing>

Figure 3:
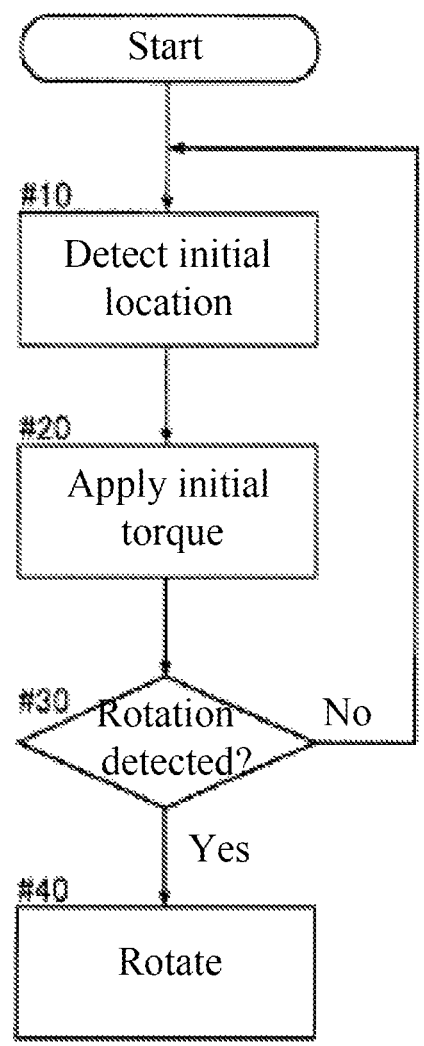
FIG. 3 is a drawing showing a flow chart of the activation processing in accordance with an embodiment.

FIG. 3 is a flow chart showing the activation processing performed by the control circuit 100. When the activation processing of the sensorless motor 22 starts, first, in the step #10, the initial position of the stopped sensorless motor 22 is detected. In the situation that the inductive sensing is used as the detection method of the initial position, in the step #10, the test current is applied by using the control circuit 100 and the driving circuit 200, and the sink current Isink is monitored by using the initial position detecting circuit 300. The control circuit 100 obtains the initial position of the sensorless motor 22 according to the initial position detecting signal S20 received from the initial position detecting circuit 300. When the initial position detection in the step #10 is ended, the step #20 is performed.

In the step #20, an initial torque corresponding to its initial position is applied to the sensorless motor 22. When the application of the initial torque in the step #20 is ended, the step #30 is performed.

In the step #30, the identification of the rotation detection is performed on the sensorless motor 22 (to identify whether the rotation state of the sensorless motor 22 is normal). For example, the control circuit 100 monitors the pulse frequency of the zero crossing signal S30 (U, V, W) or the pulse frequency of the motor rotation speed signal S2. When the pulse frequency is higher than the predetermined threshold value, the control circuit 100 identifies that the rotation state of the sensorless motor 22 is normal, and switches the rotation detecting signal Sdet (an internal signal of the control circuit 100) to a high voltage level (a logical value indicating the rotation detection).

In addition, in a situation that an identification "YES" (Sdet=H) is made in the step #30, the step #40 is performed, and the sensorless motor 22 continuously rotates. On the other hand, in a situation that the identification "NO" (Sdet=L) is made in the step #30, the step#10 is performed. The serial activation processing (the initial position detection, the application of the initial torque and the identification of rotation detection) is repeatedly performed.

Figure 4:
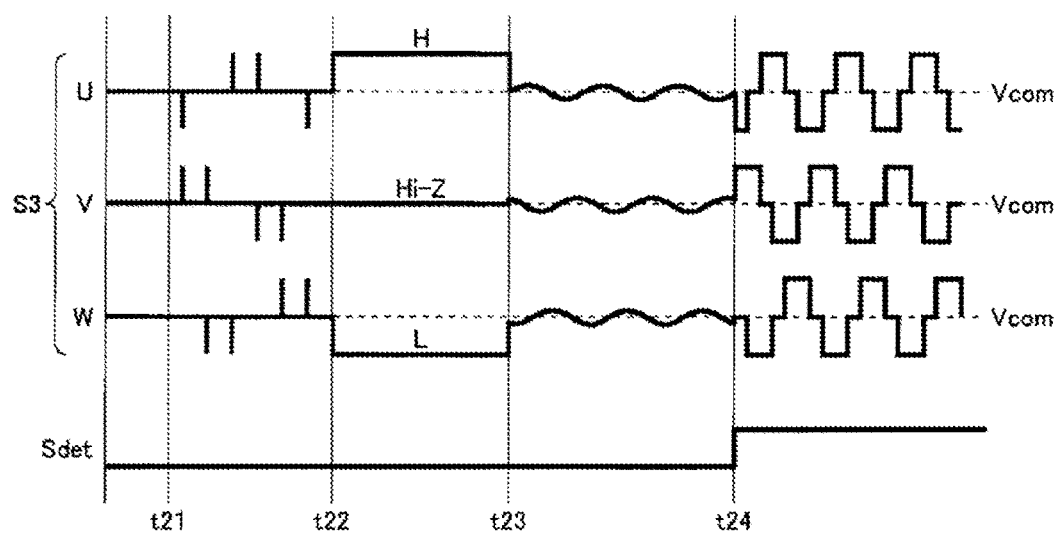
FIG. 4 is a timing diagram showing the activation processing in accordance with an embodiment.

FIG. 4 is a timing diagram showing the activation processing performed by the control circuit 100 according to an embodiment (normal activation), wherein the motor driving signal S3 (phase U, phase V, phase W) and the rotation detecting signal Sdet are illustrated in sequence from top to bottom.

Time t21~t22 is corresponding to the duration of the initial position detection (the step #10). In this duration, the motor driving signal S3 (U, V, W) is output for respectively providing the test current to each phase path (total 6 modes) of the sensorless motor 22.

Time t22~t23 is corresponding to the duration of the initial torque application (the step #20). In this duration, the motor driving signal S3 (U, V, W) is output for applying the initial torque corresponding to the initial position of the sensorless motor 22. Further, in the embodiment of this figure, in the manner that the driving current is from the motor coil of the phase U toward the motor coil of the phase W, the phase U of the motor driving signal S3 is set as a high voltage level, the phase V is set in a high impedance status, and the phase W is set as a low voltage level.

Time t23~t24 is corresponding to the duration of the motor rotation detection (the step #30). In this duration, the output of each phase of the driving circuit 200 is set to a high impedance status, so as to facilitate the observation of the voltage induced in the motor coil.

In addition, in this figure, it is exemplified that the motor rotation detection is performed at the time point that a set of the initial position detection and the application of the initial torque is ended. However, the sequence of the activation processing is not limited thereto. For example, the control circuit 100 can also be configured as that in the activation processing of the sensorless motor 22, and the motor rotation detection is performed after the initial position detection and the application of initial torque are repeatedly performed for more than one time.

In the serial activation processing, usually, if the result of the initial position detection is accurate at time t21~t22, the sensorless motor 22 will start to rotate normally through applying the initial torque at time t22~t23 to make. Therefore the rotation status of the sensorless motor 22 is identified to be normal at time t23~t24. If a certain abnormality situation happens to the sensorless motor 22, the normal motor driving will be performed after the serial activation processing is completed once after time t24.

On the other hand, when a certain abnormality (motor constraint, for example) happens to the sensorless motor 22, the identification "NO" will be made in the step #30 in FIG. 3. Hence, as long as the abnormality is not cleared, the serial activation processing is repeatedly performed.

The inventors of the present application have focused on the actions, and obtained a novel thought that the sensorless motor 22 is identified to generate certain abnormality at the time point at which the activation processing of the sensorless motor 22 can be repeatedly performed for the predetermined times. In the following descriptions and referring to figures, the thought on the motor constraint protection action is illustrated in detail.

<Motor Constraint Protection Action (Abnormality Protection Action)>

Figure 5:
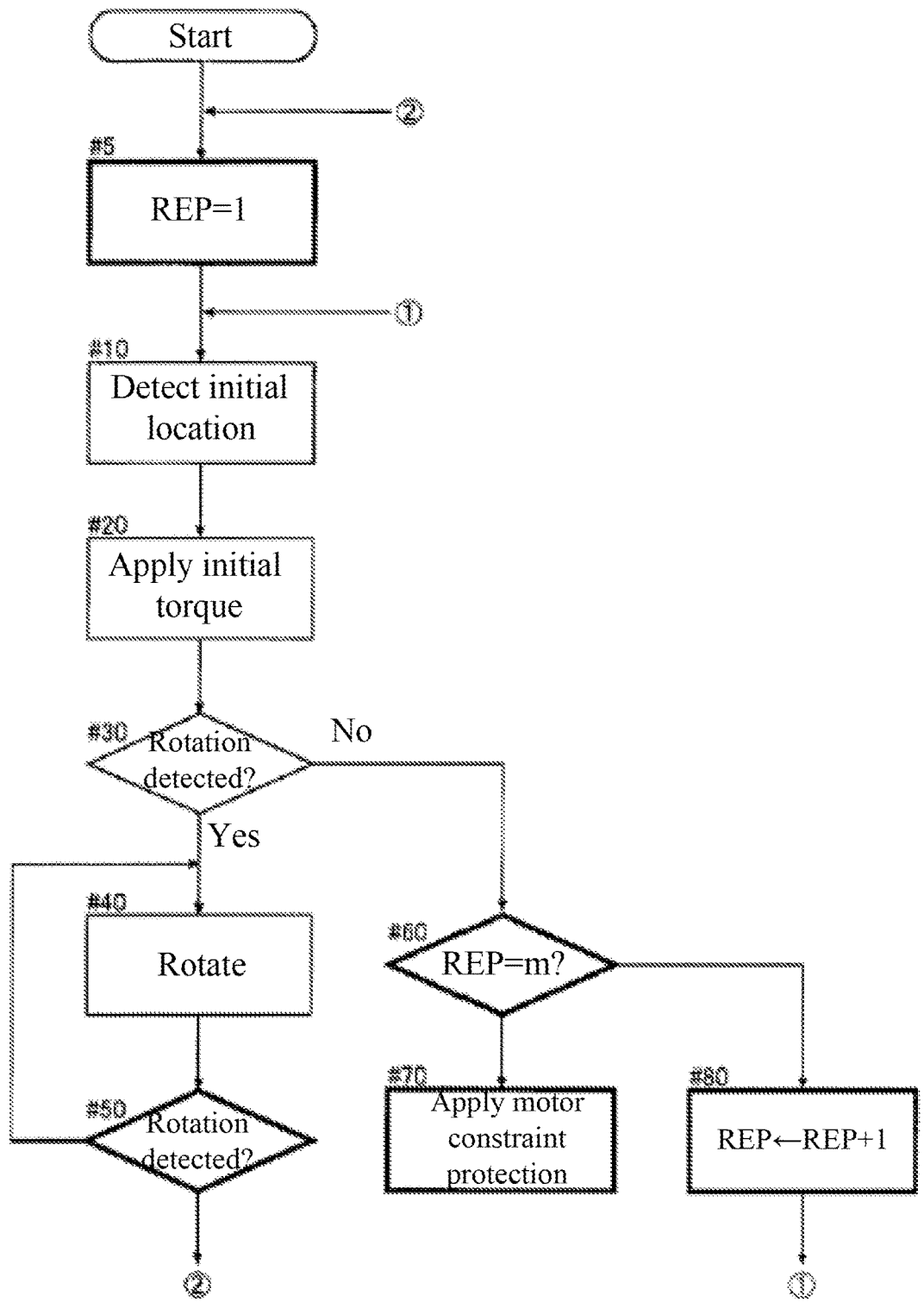
FIG. 5 is a drawing showing a flow chart of the motor constraint protection in accordance with an embodiment.

FIG. 5 shows a flow chart of the motor constraint protection action according to an embodiment. Further, this flow chart is based on FIG. 3 (activation processing). Therefore, the respective detailed descriptions about those similar to the steps #10~#40 in FIG. 3 are properly omitted. Herein, the newly added steps #5 and #50~#80 (highlighted with bold line) are emphatically illustrated.

In this flow chart, before the initial position detection in the step #10, a repetition number REP is initialized (REP=1) in the step #5. Further, REP=1 means the serial activation processing (the step #10~#30) is to be performed for the first time. In addition, when the initialization of the repetition number is ended in the step #5, the step #10 is performed.

Then, a serial activation processing (the step #10~#30), similar to those in FIG. 3, is performed. However, in this flow chart, in the situation that the identification "NO" is made in the step #30, the flow moves to the step #60 instead of directly going back to the step #10.

In the step #60, it is identified whether the repetition number REP reaches the predetermined threshold value "m" (for example, m=5). In other words, in the step #60, it is identified whether the serial activation processing (the step #10~#30) is repeatedly performed for "m" times. Herein, in the situation that the identification "YES" is made, the flow moves to the step #70, and in the situation that the identification "NO" is made, the flow moves to the step #80.

In the situation that the identification "YES" is made in the step #60, the motor constraint signal Smlp (an internal signal of the control circuit 100) is switched to a high voltage level (a logical value indicating the motor constraint happens), and the driving of the sensorless motor 22 is forced stop in the step #70.

On the other hand, in the situation that the identification "NO" is made in the step #60, the repetition number REP is increased by one (REP←REP+1) in the step #80, and the processing is back to the step #10.

For example, in the situation that the sensorless motor 22 is constrained, the sensorless motor 22 cannot rotate even the initial torque is properly applied to the sensorless motor 22. So, the identification "YES" is not made in the step #30, and the step #40 (the normal rotation) will not be entered. Consequently, the processing via the steps #10~#30, the step #60 and the step #80 is repeated for multiple times. Further, when the sensorless motor 22 still cannot rotate normally after the activation processing being proceeded for total "m"

times, the processing will move to the step #70 from the step #60, and the motor constraint protection will be applied.

In this way, before the sensorless motor 22 starts to rotate normally, the control circuit 100 repeatedly performs a serial activation processing (the step #10~#30), and forces stop the driving the sensorless motor 22 while the number of repetitions REP achieves the threshold value "m". In light of this configuration, without depending on the result of monitoring the motor rotation speed signal S2, the abnormal protection (the motor constraint protection) of the sensorless motor 22 can be easily and accurately performed according to the number of repetitions REP of the activation processing.

Further, in this flow chart, after the step #40 (the normal rotation) is performed, the rotation detection of the sensorless motor 22 is performed in the step #50. Herein, in the situation that the identification "YES" (Sdet=H) is made, the processing moves back to the step #40, and the normal rotation of the sensorless motor 22 is continuously performed. On the other hand, in the situation that the identification "NO" (Sdet=L) is made, the processing moves back to the step #5.

In other words, after the sensorless motor 22 starts the normal rotation, when the rotation status of the sensorless motor 22 becomes abnormal, the control circuit 100 initializes the repetition number REP (REP=1); before the sensorless motor 22 starts the normal rotation, the serial activation processing (the step #10~#30) is performed again; and when the repetition number REP reaches the threshold value "m", the driving of the sensorless motor 22 is forced stop. Through this configuration, for example, in the situation that the rotating sensorless motor 22 is hold by a hand, the motor constraint protection can also be properly applied.

Figure 6:
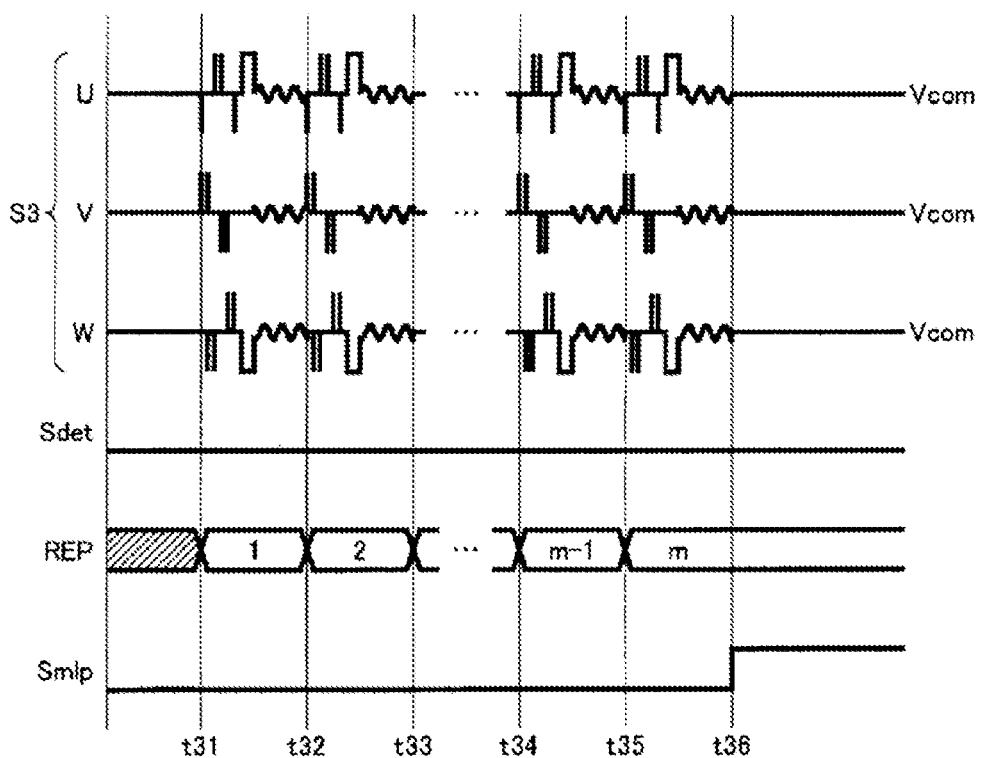
FIG. 6 is a timing diagram showing the time sequence of the motor constraint protection in accordance with an embodiment.

FIG. 6 is a timing diagram showing the motor constraint protection according to an embodiment (to activate the sensorless motor 22 in the situation that the sensorless motor 22 is hold by a hand), wherein the motor driving signal S3 (phase U, phase V, phase W), the rotation detecting signal Sdet, the repetition number REP and the motor constraint protection signal Smlp are illustrated from top to bottom.

At time t31~t32, the first activation processing is performed (corresponding to time t21~t14 in FIG. 4); however, due to that the sensorless motor 22 does not rotate normally, the rotation detecting signal Sdet is kept as a low voltage level. Consequently, the same activation processing is also repeatedly performed after time t32. Then, if the sensorless motor 22 cannot rotate normally after the activation processing being performed for total "m" (time t35~t36), the motor constraint signal Smlp is asserted to a high voltage level (a logical value indicating the motor constraint) at time t36, and the driving of the senserless motor 22 is forced stop.

<Other Variations>

In addition to the disclosed embodiments, each technical feature disclosed in the specification of the present application can be applied with various modifications without departing the spirit of the present disclosure. In other words, it should be considered that the disclosed embodiments are exemplary and have no limitations, and it should be understood that the technical scope of the present invention is defined by claims rather than the disclosed embodiments, and includes equivalents of claims and all modifications within the scope.

Industrial Applicability

The present invention can be used in all electronic apparatus including motors.

What is claimed is:

1. An electronic apparatus, comprising:
    a motor driving device integrated as a semiconductor device, the motor driving device comprising:
        a control circuit operable to generate a driver control signal;
        a driving circuit operable to generate a motor driving signal according to the driver control signal;
        an initial position detecting circuit operable to detect an initial position of a motor; and
        a rotation detecting circuit operable to detect a rotation status of the motor,
    wherein before the motor starts rotate normally, the control circuit repeatedly performs a serial activation processing including detecting an initial position, applying an initial torque and detecting a motor rotation, and forces to stop driving the motor when a repetition number reaches a threshold value;
    a sensorless motor driven by the semiconductor device;
    a digital signal processor operable to generate a target rotation speed signal; and
    a PLL (phase locked loop) circuit operable to generate an acceleration signal and a deceleration signal to the semiconductor device by performing a phase synchronization control of the target rotation speed signal input from the digital signal processor and a motor rotation speed signal input from the semiconductor device.

2. The electronic apparatus of claim 1, further comprising:
    a first substrate to support the digital signal processor and the PLL circuit; and
    a second substrate to support the semiconductor device and the sensorless motor.

3. The electronic apparatus of claim 1, wherein the initial position detecting circuit is operable to detect the initial position by inductive sensing.

4. The electronic apparatus of claim 1, wherein the rotation detecting circuit is operable to monitor voltage induced in a motor coil, for detecting the rotation status of the motor.

5. The electronic apparatus of claim 4, wherein
    the rotation detecting circuit is operable to generate a zero crossing signal for each phase according to the voltage induced in the motor coil, and to generate a motor rotation speed signal corresponding to a motor rotation speed according to the zero crossing signal of each phase, and
    the control circuit is operable to monitor the zero crossing signal of each phase or the motor rotation speed signal for detecting whether the rotation status of the motor is normal.

6. The electronic apparatus of claim 1 operable such that when the rotation status of the motor becomes abnormal, the control circuit performs the activation processing again.

7. The electronic apparatus of claim 1 operable such that during the activation processing, the control circuit repeatedly performs multiple sets of the detecting an initial position and the applying an initial torque, and then performs the motor rotation detection.

* * * * *